(12) United States Patent  
Takao

(10) Patent No.: US 7,684,175 B2  
(45) Date of Patent: Mar. 23, 2010

(54) DISPLAY APPARATUS

(75) Inventor: Mitsuyoshi Takao, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 60 days.

(21) Appl. No.: 12/167,968

(22) Filed: Jul. 3, 2008

(65) Prior Publication Data

US 2009/0168310 A1    Jul. 2, 2009

(30) Foreign Application Priority Data

Dec. 27, 2007   (JP) .............................. 2007-337097

(51) Int. Cl.  
    *G06F 1/16*   (2006.01)
(52) U.S. Cl. ............................ 361/679.01; 248/276.1; 381/333; 349/141; 345/173
(58) Field of Classification Search ................ 248/121, 248/371, 276.1, 157, 408; 381/333; 211/85.18; 345/158, 649, 87, 173; 361/679.01, 679.21, 361/679.22, 679.27, 679.06, 679.29, 679.41; 349/60, 58, 141
See application file for complete search history.

(56) References Cited

U.S. PATENT DOCUMENTS

| | | | |
|---|---|---|---|
| 5,942,744 A | 8/1999 | Kamo et al. | |
| 6,016,959 A | 1/2000 | Kamo et al. | |
| 2004/0011932 A1 * | 1/2004 | Duff | 248/157 |
| 2006/0008103 A1 * | 1/2006 | Takahashi et al. | 381/333 |
| 2006/0076463 A1 * | 4/2006 | Drew | 248/121 |
| 2008/0179483 A1 * | 7/2008 | Takao | 248/371 |
| 2009/0179126 A1 * | 7/2009 | Lee | 248/276.1 |

FOREIGN PATENT DOCUMENTS

| | | |
|---|---|---|
| JP | U-H01-162321 | 11/1989 |
| JP | 7262684 | 10/1995 |
| JP | 10-283865 | 10/1998 |
| JP | 2005-308069 | 4/2005 |
| JP | 2006-146100 | 6/2006 |
| JP | U-3130612 | 3/2007 |

OTHER PUBLICATIONS

Japanese Office Action in counterpart application, Mailed Dec. 24, 2008 (English Translation).

* cited by examiner

*Primary Examiner*—Hung V Duong  
(74) *Attorney, Agent, or Firm*—Blakely, Sokoloff, Taylor & Zafman LLP

(57) ABSTRACT

In a display apparatus (1), a stand leg (120) is made of a casting material which has a light-weight and which is hard to be deformed in a twist direction, and a display portion fixing members (121) each being made of a steel sheet material which is excellent in ductility are fixed to the stand leg (120) by using screws to form a supporting body (12). Therefore, it is possible to obtain the small-scale supporting body (12) in which there is no reduction in strength of a member having strength as compared with an integral molded article made by casting.

3 Claims, 7 Drawing Sheets

DISPLAY APPARATUS

The present application is based on Japanese patent application No. 2007-337097, the entire contents of which are incorporated herein by reference.

BACKGROUND

1. Field

One embodiment of the invention relates to a display apparatus.

2. Description of the Related Art

Heretofore, with regard to a display apparatus composed of a stand portion and a display portion, there is known one in which the display portion is rotatably fixed to the stand portion. This display apparatus, for example, is described in the Japanese Patent Kokai No. 2006-146100.

This display apparatus has a rotation supporting mechanism for rotatably supporting the display portion in the stand portion, and the rotation supporting mechanism has a pair of mounting portions with which the display portion is mounted to the stand portion by using screws. The mounting portions paired with each other are provided in respective end portions of left and right arm portions extending above the rotation supporting mechanism so as to upward extend. After being engaged with holes or detents formed on a back surface of the display portion, the pair of mounting portions is fixed to the display portion by using setscrews.

However, in the case of the conventional display apparatus, the pair of mounting portions is integrated with the rotation supporting mechanism, which results in that not only the construction is scaled up to increase a weight, but also a manufacturing cost increases. Thus, the existence of such a large member having strength causes reduction in transport efficiency in a phase of scrapping the display apparatus, thereby reducing a recycling efficiency.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION OF PREFERRED EMBODIMENTS

Various embodiments according to the invention will be described hereinafter with reference to the accompanying drawings. In general, according to one embodiment of the invention, there is provided a display apparatus, including: a display portion; and a stand portion for supporting the display portion; the stand portion including: a supporting body for supporting the display portion; a second member having ductility; and a first member having end portions to which the second members are mounted, respectively.

According to the invention, it is possible to obtain the display apparatus which is excellent in a recycling efficiency because reduction in strength, and scaling-up of the member having strength are prevented.

Hereinafter, a display apparatus according to an embodiment of the invention will be described in detail with reference to the accompanying drawings.

Figure 1:
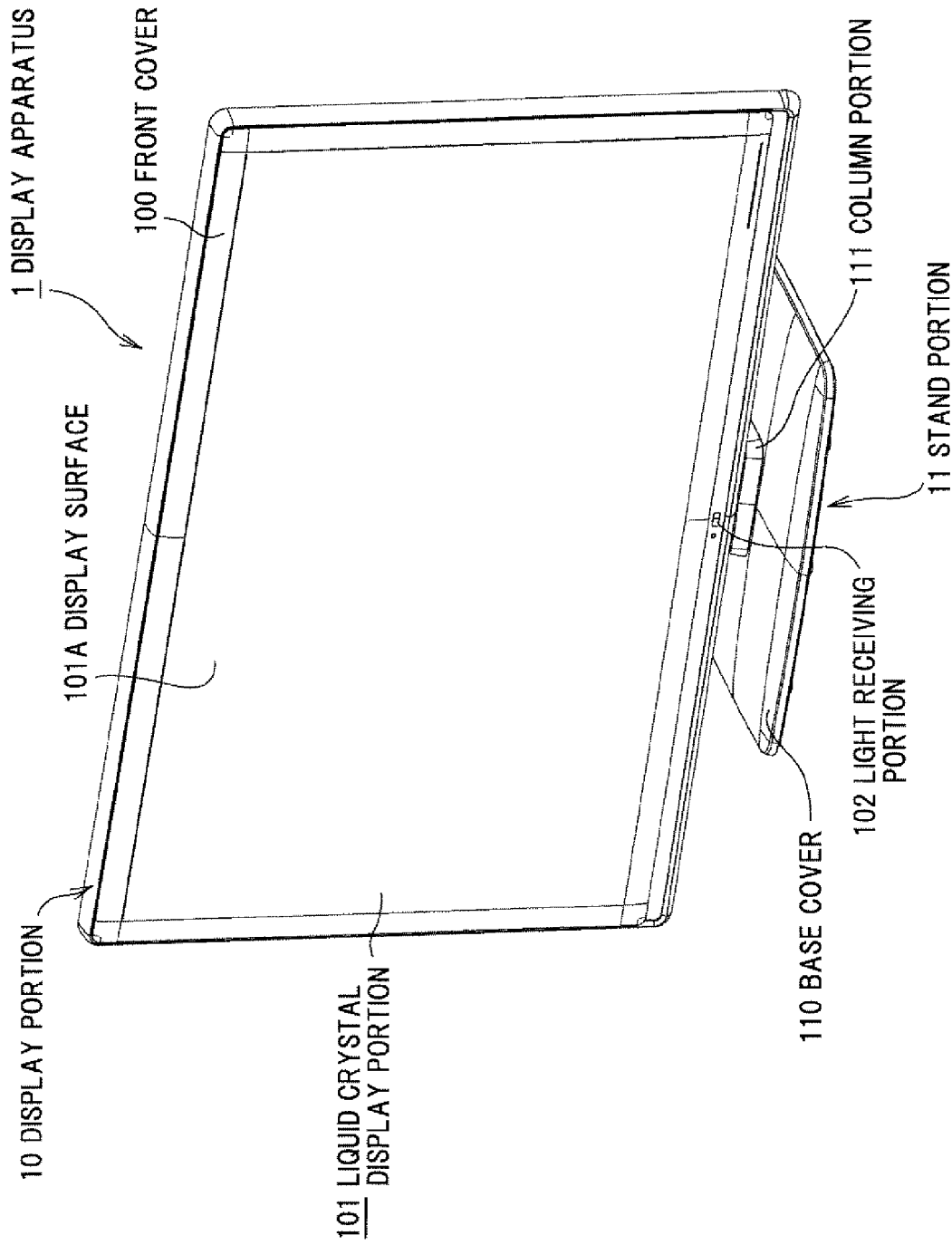
FIG. 1 is a perspective view showing a display apparatus according to an embodiment of the invention.

FIG. 1 is a perspective view showing a display apparatus according to an embodiment of the invention. The display apparatus 1 is composed of a display portion 10, and a stand portion 11 for rotatably supporting the display portion 10.

The display portion 10 includes a front cover 100 made of a resin material such as Acrylonitrile Butadiene Styrene (ABS), polycarbonate or acrylic, a liquid crystal portion 101 for displaying an image on a display surface 101A, and a light receiving portion 102 for receiving an optical manipulation signal from a remote controller (not shown).

The stand portion 11 includes a rectangular base cover 110 made of a resin material such as ABS, polycarbonate or acrylic, and a column portion 111 which is provided in a rectangle shape at a center of the base cover 110. A swivel mechanism (not shown) for rotatably supporting the display portion 10 within a predetermined angle range and around an axis provided (vertically) in a direction vertical to a surface direction of a surface having the stand portion 11 placed thereon is provided inside the column portion 111.

Figure 2:
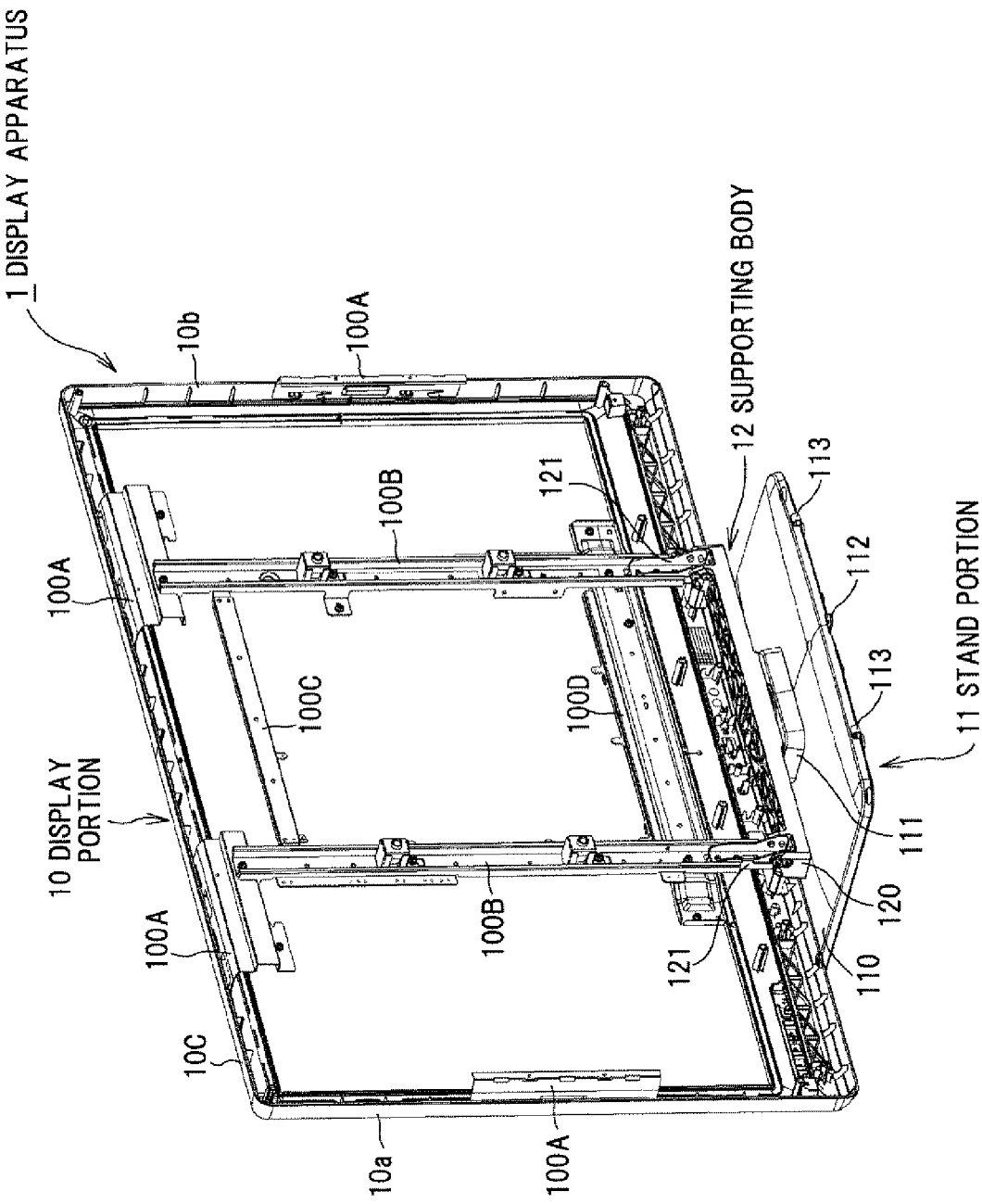
FIG. 2 is a perspective view showing a back surface side of the display apparatus according to the embodiment of the invention.

FIG. 2 is a perspective view showing a back surface side of the display apparatus shown in FIG. 1. Referring to FIG. 2, there is shown a state in which the liquid crystal display portion 101 and a back surface cover of the display portion 10 are removed away. In the display portion 10, the front cover 100 has fixing members 100A for fixing the back surface cover (not shown) to side walls 10a and 10b, and an upper wall 10c. Two frames 100B which are fixed to a stand leg 120 which will be described later are vertically provided in the fixing members 100A provided in the upper wall 10C of the front cover 100, respectively. The two frames 100B are fixed by reinforcing members 100C and 100D so as to be held in parallel with each other.

In addition, the stand member 11 further includes a falling preventing member 112 which is drawably provided on the back surface side of the base cover 110 and which serves to prevent the falling of the display apparatus 1, and hooks 113 for fixing the stand portion 11 to a fixing system by using a string member such as a wire. The stand leg 120 for supporting the display portion 10 is erected on the column portion 111. The stand leg 120 is fixed to the swivel mechanism (not shown) provided inside the column portion 111, and forms a supporting body 12 which has a predetermined length in a horizontal direction and which is provided with display portion fixing members 121 for fixing the display portion 10 to its opposite end portions. It is noted that although the supporting construction is adopted in which the display portion 10 can be rotated due to the provision of the swivel mechanism, a supporting construction may also be adopted instead in which no display portion 10 is rotated owing to no provision of the swivel mechanism.

Figure 3:
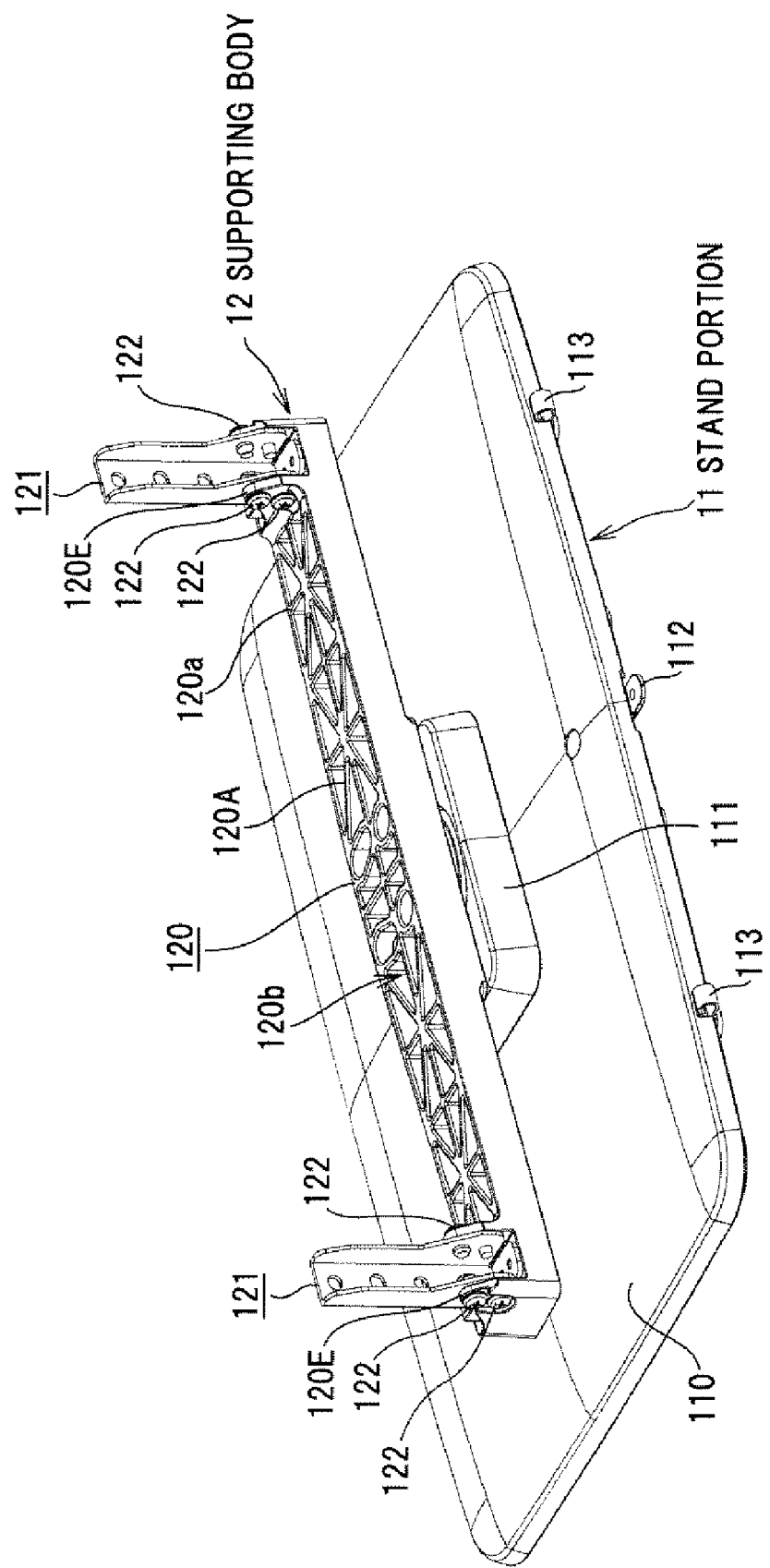
FIG. 3 is a perspective view of a stand portion and a supporting body of the display apparatus shown in FIG. 1 in a state in which a display portion is unfixed from the supporting body.
Figure 4:
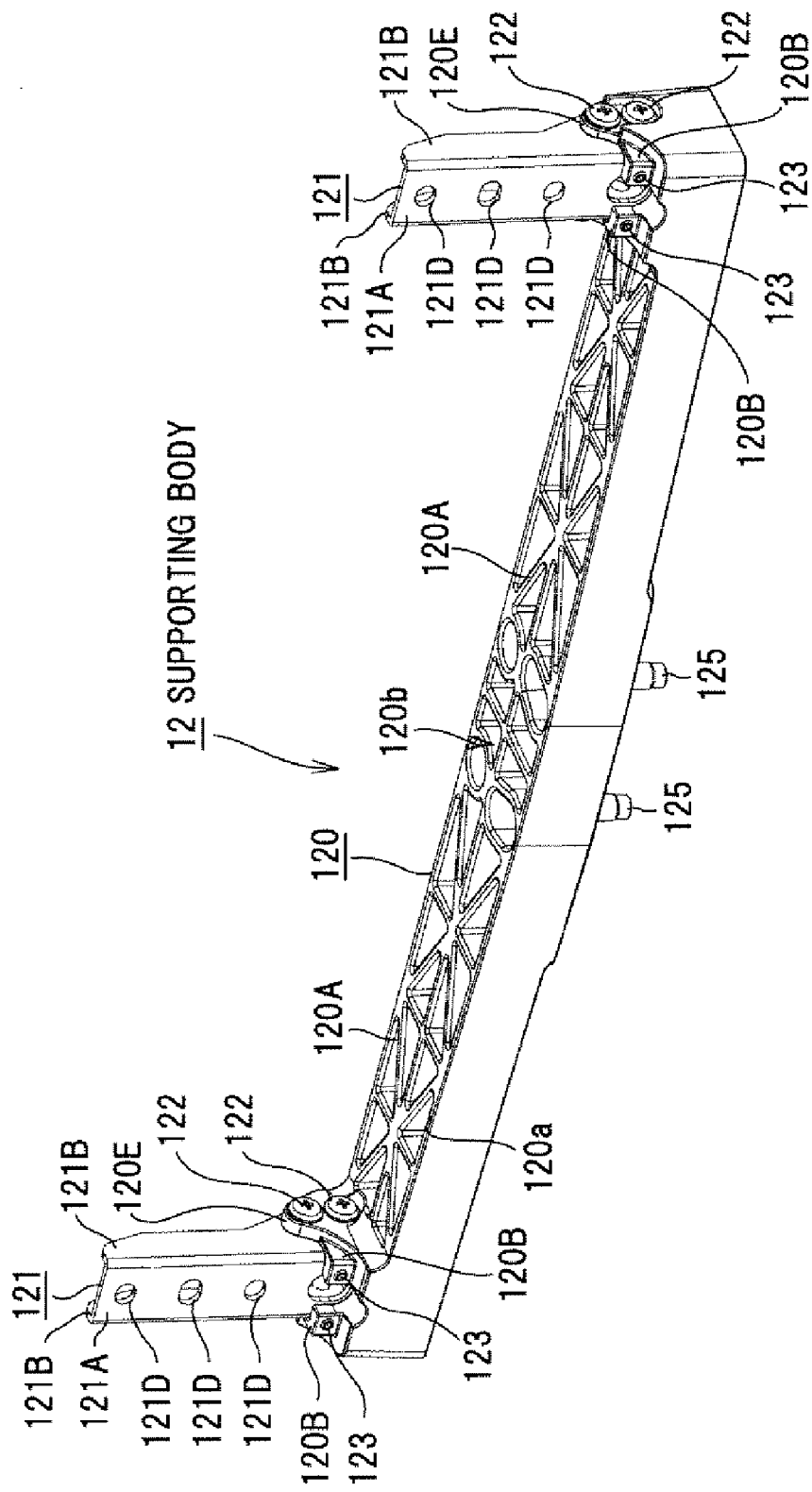
FIG. 4 is a perspective view of a stand leg as the supporting body including display portion fixing members.
Figure 5:
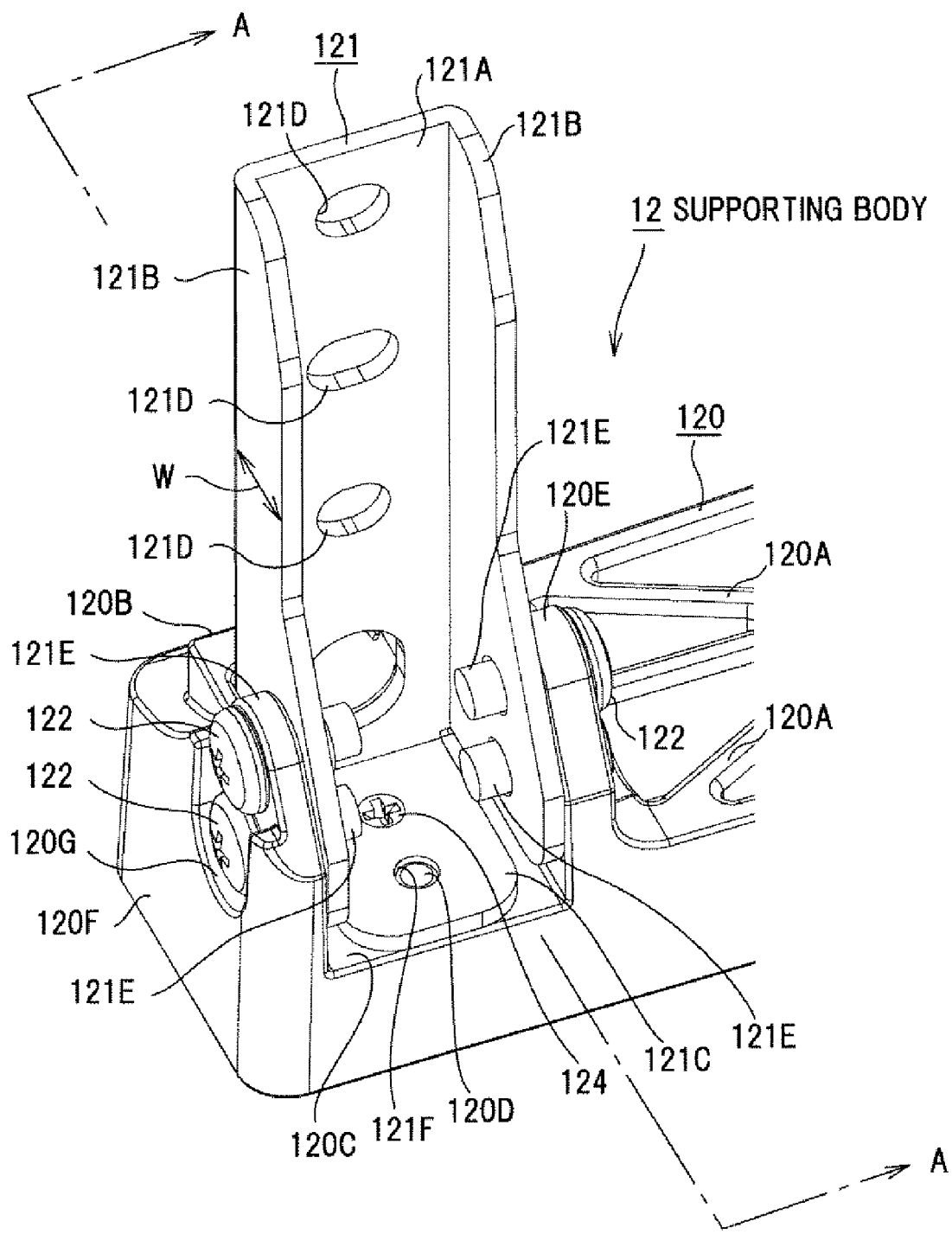
FIG. 5 is a perspective view showing a state of fixing the display portion fixing member shown in FIG. 4.
Figure 6:
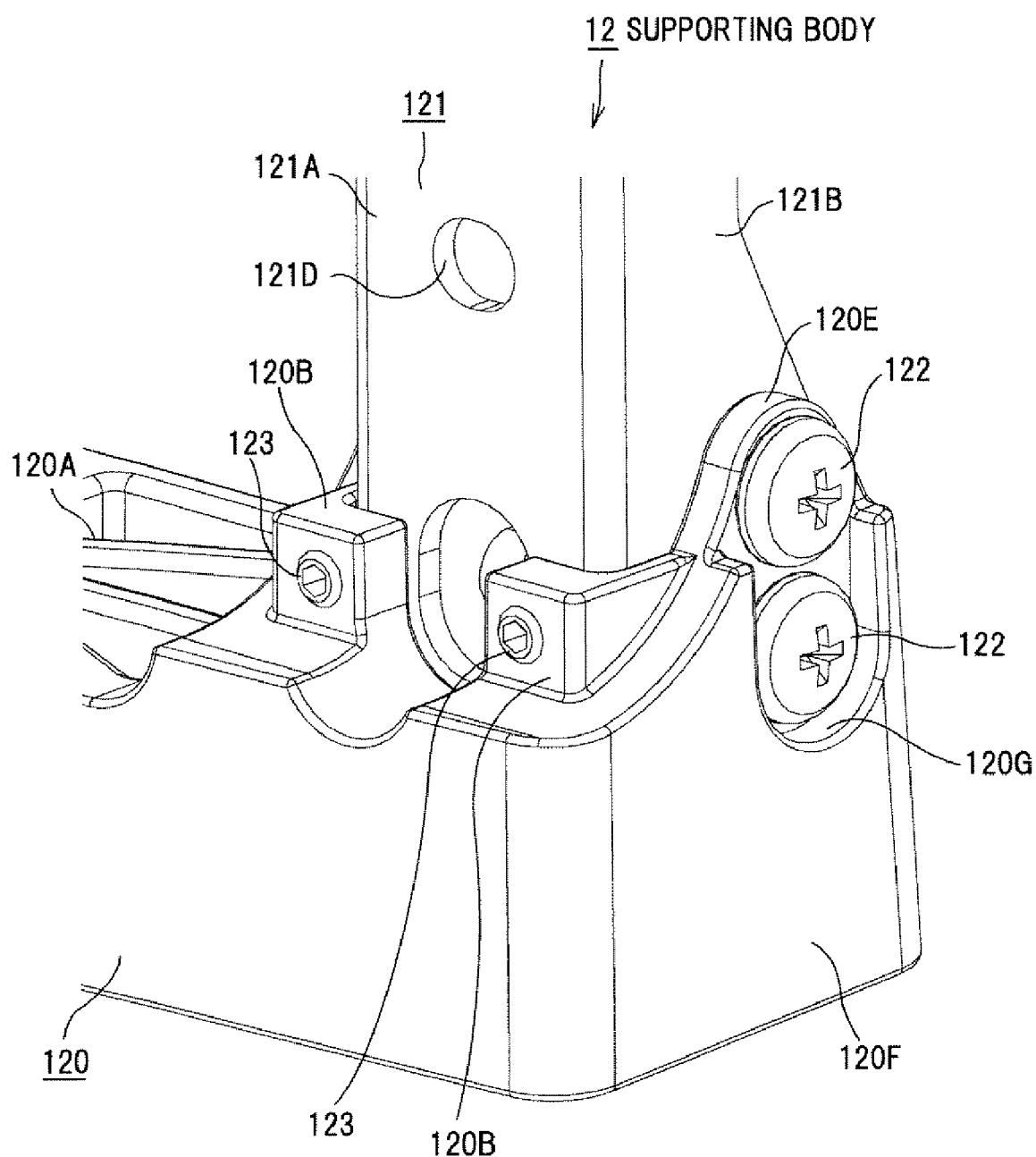
FIG. 6 is a perspective view showing a mechanism for fine-adjusting an inclination angle of the display portion fixing member shown in FIG. 4.

FIG. 3 is a perspective view of the stand portion and the supporting body of the display apparatus shown in FIG. 1 in a state in which the display portion is unfixed from the supporting body, FIG. 4 is a perspective view of the supporting body including display portion fixing members, FIG. 5 is a perspective view showing a state of fixing the display portion fixing member shown in FIG. 4, and FIG. 6 is a perspective view showing a mechanism for fine-adjusting an inclination angle of the display portion fixing member shown in FIG. 4.

The stand leg 120 is made of an aluminum alloy, and is formed by performing casting so as to have a predetermined length. In addition, a lightening portion 120b is formed as a portion for lightening the member weight vertically from an upper surface 120a, and also a rib 120A is formed as a portion for preventing reduction in strength in a twist direction due to the lightening. In addition, as shown in FIG. 4, protrusions 125 which are engaged with holes (not shown) formed in the swivel mechanism, respectively, are provided in a lower portion of a central portion of the stand leg 120.

Each of the display portion fixing members 121, for example, is formed by pressing a general cold-rolled steel sheet material. Thus, as shown in FIG. 5, each of the display portion fixing members 121 has a front wall 121A, side walls 121B, and a bottom wall 121C. Screw holes 121D for fixing corresponding one of the frames 100B are provided in the front wall 121A.

In this embodiment, each of the display portion fixing members 121 is folded in a way that as shown in FIG. 5, a folding angle of each of the side walls 121B and the bottom wall 121C makes at 90 with the front wall 121A. Also, screw fixing portions 121E for fixing screws 122 for fixing the corresponding one of the display portion fixing members 121 to the stand leg 120 are provided integrally with each of the side walls 121B.

Each of the side walls 121B is Formed in a way that a width W of a portion on an upper side from the vicinity of the lowermost screw hole 121D becomes smaller than that of a portion having the screw fixing portions 121E provided therein so as to allow the deformation when an external force, for example, is applied to the front wall 121A in a direction of the bottom wall 121C. In addition, each of the side walls 121B, and the bottom wall 121C are formed at a distance from each other so as not to contact each other when an angle of the front wall 121A changes with respect to the bottom wall 121C.

The bottom wall 121C is fixed to a dent 120C of the stand leg 120 by using a screw 124, and a hole 121F is engaged with a convex positioning protrusion 120D formed in the dent 120C, thereby positioning the display portion fixing member 121 within the dent 120C. The outside of each of the corresponding ones of the side walls 121B is supported by a screw penetrating portion 120E which is provided in the stand leg 120 so as to have a height in a vertical direction. Also, the display portion fixing member 121 is fixed to the stand leg 120 by tightening up the corresponding one of the screws 122 which is inserted through the screw penetrating portion 120E. A recess portion 120G for accommodating therein head portions of the screws 122 so as to prevent the head portions of the screws 122 after completion of the tightening-up from being protruded from a side wall 120F is formed in the side wall 120F of the stand leg 120.

In addition, as shown in FIG. 6, the display portion fixing member 121 is constructed in such a way that setscrews 123, each having no head portion, screwed into respective front wall supporting portions 120B provided in the stand leg 120 prevent backlash from occurring between the front wall 121A and the front wall supporting portions 120B. As a result, each of the display portion fixing members 121 in this embodiment is fixed to the stand leg 120 by using five screws, and thus has a construction such that the two setscrews 123 prevent the backlash from occurring therebetween. It is noted that the front wall 121A may be fixed to the front wall supporting portions 120B by using normal screws each having a head portion instead of using the setscrews 123 each having no head portion used in this embodiment.

Figure 7:
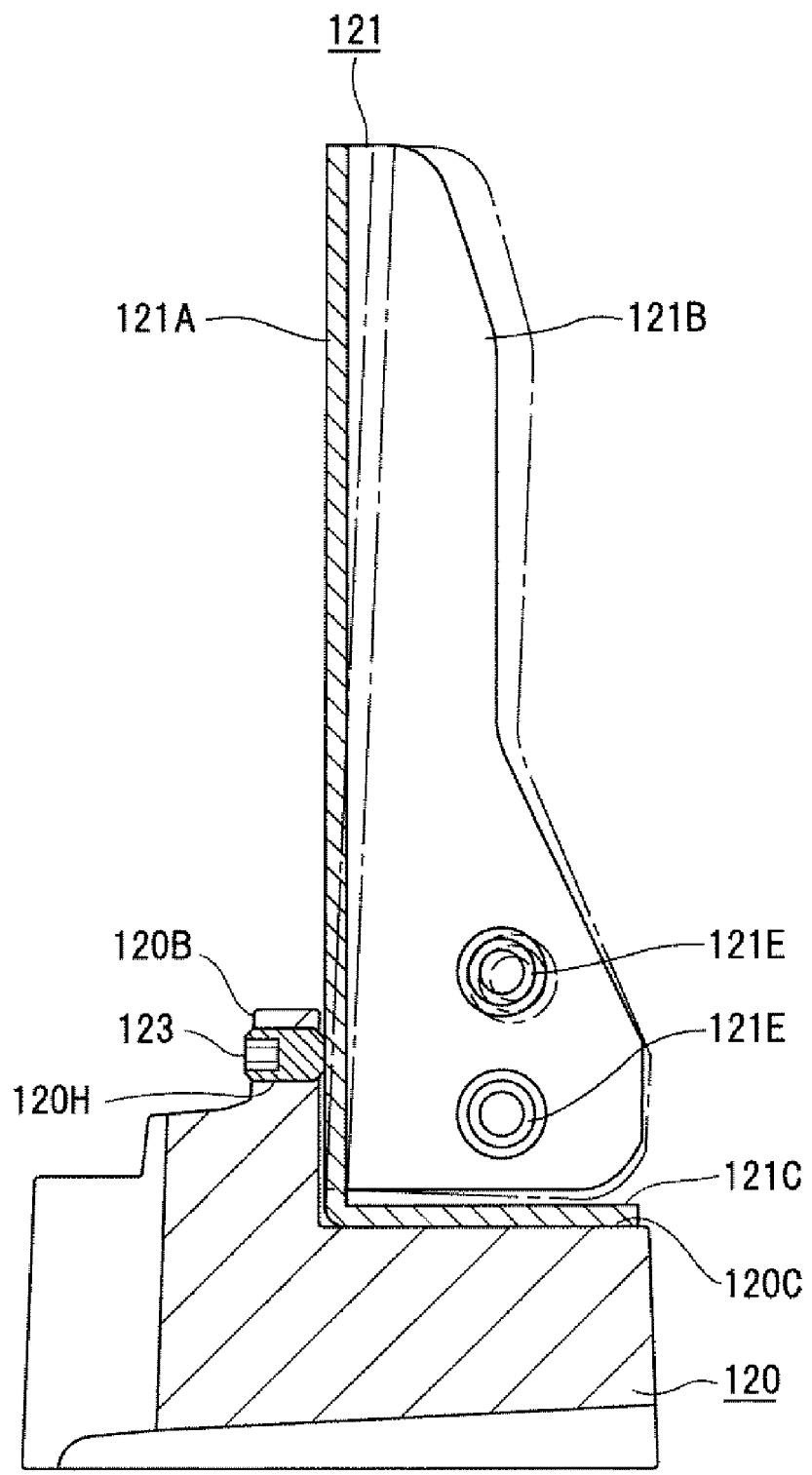
FIG. 7 is a cross sectional view, of the stand leg and the display portion fixing member, taken on line A-A of FIG. 5.

FIG. 7 is a cross sectional view, of the stand leg and the display portion fixing member, taken on line A-A of FIG. 5.

In this stand leg 120, the tightening-up of the setscrews 123 described above, for example, results in that it is possible to fine-adjust a mounting angle for the liquid crystal display portion 101. In this case, as shown in FIG. 7, the setscrews 123 function as an angle fine-adjusting mechanism for fine-adjusting an inclination angle (backward inclination) of the display portion fixing member 121 with respect to the stand leg 120.

The angle fine-adjustment for the display portion fixing member 121 is carried out by inclining both the front wall 121A and the side walls 121B with the lower screw fixing portion 121E as a center. Firstly, the screws 122 mounted to the screw fixing portions 121E, respectively, shown in FIG. 5 are loosened up so that each of the side walls 121B can be displaced in an inclination direction of the front wall 121A. Next, the tightening up of the two setscrews 123 results in that the front wall 121A is press-bent to be backward inclined. At this time, as shown in FIG. 5, the bottom wall 121C is fixed by the screw 124. Therefore, the angle is adjusted in a state in which the backlash is suppressed by a reaction force against the deformation of the front wall 121A, and the tightening forces of the setscrews 123. When a desired backward inclination angle (for example, 1°) is obtained, the four screws 122 are tightened up, thereby fixing the display portion fixing member 121 to the stand leg 120. It is noted that the setscrews 123 may be fixed to the screw holes 120H, respectively, by using a fixing agent such as a screw cramp agent as a material for preventing the setscrews 123 from dropping out.

According to the above-mentioned embodiment of the invention, the stand leg 120 is made of the casting material which has a light-weight and which is hard to be deformed in the twist direction, and the display portion fixing members 121 each being made of the steel sheet material which is excellent in ductility are fixed to the stand leg 120 by using the screws to form the supporting body 12. Therefore, it is possible to obtain the small-scale supporting body 12 in which there is no reduction in strength of the member having strength as compared with the integral molded article made by the casting.

In addition, since the display portion fixing members 121 are fixed to the stand leg 120 by using the screws, the screw cramp is released in a phase of the scrapping of the stand leg 120 and the display portion fixing members 121, so that the stand leg 120 and the display portion fixing members 121 can be scrapped as independent parts. As a result, it is possible to obtain the excellent recycling efficiency.

In addition, each of the display portion fixing members 121 is made of the steel sheet material, which results in that the adjustment for the backward inclination angle by the tightening-up of the setscrews 123 can be readily carried out in the state in which a part of the display portion fixing members 121 is fixed to the stand leg 120 by using the screws 122, 123 and 124. In this case, it is possible to perform the adjustment for the backward inclination angle which is free from the backlash between the stand leg 120 and each of the display portion fixing members 121.

Other Embodiments

It is noted that the present invention is by no means limited to the embodiment described above, and various changes can be made without departing from or changing the technical idea of the present invention.

For example, although each of the display portion fixing members 121 is formed by pressing the general cold-rolled steel sheet material, it may also be made of any other suitable metallic material or a composite material of a metal and any other suitable material. In addition, with regard to a part of the method as well of fixing the display portion fixing members 121 to the stand leg 120, the display portion fixing members 121 may also be fixed to the stand leg 120 by using penetrating pins as substitute for the screw cramp.

It should be noted that the present invention is not limited to the embodiment described above, and the various combinations and changes may be made without departing from or changing the technical idea of the present invention.

What is claimed is:

1. A display apparatus, comprising:
a display portion; and
a stand portion for supporting the display portion;
wherein the stand portion has a supporting body comprising a first member and a second member mounted on end portions of the first member and having ductility, the display portion being fixed to the second member of the supporting body; and
the supporting body comprises a screw-fixing structure in which a state of mounting the second member to the first member is adjustable, and an inclination angle of the display portion is adjustable using the ductility given to the second member by adjusting a distance between a first portion of the second member and the first member by a screw cramp construction in a state that a second portion distant from the first portion of the second member is fixed to the first member.

2. A display apparatus according to claim 1, wherein the first member is made of a casting material, and the second member is made of a steel material.

3. A display apparatus according to claim 1, wherein the second member comprises a front wall on which the display portion is mounted, side walls bent toward one surface side of the front wall and fixed to the first member by the screw-fixing structure, and a bottom wall bent toward the one surface side of the front wall and formed at a distance from the side walls so that the second member does not contact with the side walls even when an angle of the front wall is deformed due to the screw cramp construction.

* * * * *